United States Patent [19]

Langner

[11] Patent Number: 5,390,481
[45] Date of Patent: Feb. 21, 1995

[54] CAROUSEL ASSEMBLY OF HELICAL TUBE BUNDLES

[75] Inventor: Carl G. Langner, Spring, Tex.

[73] Assignee: Shell Oil Company, Houston, Tex.

[21] Appl. No.: 837,130

[22] Filed: Feb. 19, 1992

[51] Int. Cl.[6] ............................................. D01H 7/22
[52] U.S. Cl. ........................................ 57/65; 57/314
[58] Field of Search ...................... 57/210, 3, 6, 13, 59, 57/62, 65, 314, 127.5, 127.7

[56] References Cited

U.S. PATENT DOCUMENTS

| | | | |
|---|---|---|---|
| 4,714 | 8/1846 | Newall | 57/65 |
| 607,932 | 7/1898 | Husham | 138/111 |
| 1,093,053 | 4/1914 | Horn | 57/65 |
| 2,004,634 | 6/1935 | Petterson | 57/65 |
| 2,179,304 | 11/1939 | Somerville | 57/65 |
| 2,724,944 | 11/1955 | Carleton et al. | 57/55 |
| 2,802,328 | 8/1957 | Ritchie | 57/65 X |
| 2,832,374 | 4/1958 | November | 138/50 |
| 3,106,815 | 10/1963 | Nance et al. | 57/13 |
| 3,128,799 | 4/1964 | Kerr | 140/149 |
| 3,197,953 | 8/1965 | Dawbarn et al. | 57/147 |
| 3,269,422 | 8/1966 | Matthews et al. | 138/111 |
| 3,315,703 | 4/1967 | Matthews et al. | 138/111 |
| 3,400,737 | 9/1968 | Matthews et al. | 138/111 |
| 3,411,285 | 11/1968 | McDonald | 57/59 |
| 3,478,505 | 11/1969 | Braaten et al. | 57/59 |
| 3,526,086 | 9/1970 | Morgan | 57/149 |
| 4,112,660 | 9/1978 | Ferrentino et al. | 57/59 |
| 4,256,146 | 3/1981 | Genini et al. | 138/111 |
| 4,529,334 | 7/1985 | Ortloff | 405/195 |
| 4,530,205 | 7/1985 | Seiler et al. | 57/9 |
| 4,574,574 | 3/1986 | Knaak | 57/314 X |
| 4,843,713 | 7/1989 | Langner et al. | 29/799 |

FOREIGN PATENT DOCUMENTS

| | | |
|---|---|---|
| 0177475 | 4/1986 | European Pat. Off. . |
| 562194 | 10/1932 | Germany ............................. 57/65 |
| 676224 | 7/1952 | United Kingdom . |
| 838070 | 6/1960 | United Kingdom . |
| 923816 | 4/1963 | United Kingdom . |
| 1160508 | 8/1969 | United Kingdom . |
| 1210206 | 10/1970 | United Kingdom . |
| 2038988A | 7/1980 | United Kingdom . |
| 1601122 | 10/1981 | United Kingdom . |

OTHER PUBLICATIONS

"Thriving R&D Yields New Technology and Products," Ocean Industry, Apr. 1986, pp. 264–265.
"Bundles Offer Reel Advantages," Offshore Engineer, Mar., 1986, pp. 38–42.
"The Bundle . . . and How to Make It," Kvaerner Subsea Contracting no date available.
"A New Multiple Flow—and Control Line Bundle System," Rolf Kvamsdal, Ragnar Bognaes, Kvaerner Subsea Contracting no date available.

Primary Examiner—Joseph J. Hail, III
Attorney, Agent, or Firm—Del S. Christensen

[57] ABSTRACT

A helical bundle of tubes is fabricated with a carousel-type machine, preferably rotating about a vertical axis. Spools of coil tubing are mounted on radial beams extending from a central rotating hub, and are indexed to maintain the axes of the spools in a constant direction. In the preferred vertical rotating axis configuration, the tubes are pulled off the spools by an overhead capstan, and the finished bundle is deposited on a take-up reel. A preferred way of indexing the spools uses chains passing around equal size sprockets attached to the vertical support shafts with at least one of the chains passing around a stationary central sprocket.

11 Claims, 2 Drawing Sheets

CAROUSEL ASSEMBLY OF HELICAL TUBE BUNDLES

FIELD OF THE INVENTION

This invention relates to an apparatus to assemble helical tube bundles.

BACKGROUND OF THE INVENTION

A fast and efficient method for installing small diameter flowlines and control lines offshore is by means of reel, tensioner, and straightener devices mounted on a floating vessel. However, this "pipe reel" method becomes awkward if multiple lines must be laid simultaneously, as is often the case for flowlines and control lines laid to, or originating at, seafloor wellheads. A typical flowline bundle to such a subsea well consists of production flowlines, annulus access line, chemical injection line, hydraulic power line and electrical control cable. When multiple lines are to be laid in a single bundle, it becomes necessary to spool each line onto a separate reel, and then either (1) lay each line separately off the floating vessel while carefully monitoring each suspended span, or (2) bring the separate lines together and wrap them with tape to form a "flowline bundle" which is then laid into the water as a single entity. Alternately, a flowline bundle may be placed inside a large "carrier pipe" and towed into position, instead of being laid from a vessel.

When lines are brought together and simply wrapped to provide a multiple tube bundle without twisting the tubes, the wrapped bundle has very poor mechanical behavior in bending. The tube bundles cannot be spooled onto reels or pulled through curved conduits such as J-tubes, etc., due to the buckling of the tubes on the inside radius as they are placed in compression. This buckling of the tubes due to bending may be avoided by first winding the tubes into a continuous rope-like set of helixes. For applications requiring bending a bundle of tubes, the helical bundle configuration is therefore highly desirable.

An apparatus for preparing such a helical bundle is disclosed in U.S. Pat. No. 4,843,713. This apparatus is capable of preparing bundles of pipe and tubing by laying out straight lengths of the pipe and tubing, then rotating and translating the end of the bundle after it passes through a special twist head. Alternately, the bundle may be formed by rotating the straight lengths of pipe and tube and simply translating the end of the bundle after passing through the twist head. The sections of helically bundled pipe and tube can then be joined with other helical bundles and rolled onto a reel from which the bundle may be carried offshore and laid.

The apparatus of U.S. Pat. No. '713 can only bundle separate lengths of pipe and tubing which are not longer than the length of the work space available. These limited lengths must then be joined. The resultant connections slow the fabrication process and create discontinuities in the external corrosion coating. It would be preferable to provide an apparatus and method to prepare helically coiled tube bundles wherein spools of tubing could be wound to provide extended lengths of bundles without coupling.

Helically wound tubing bundles are also disclosed in U.S. Pat. Nos. 607,932, 2,832,374, 3,269,422, 3,315,703, 3,400,737, 3,526,086, and 4,256,146, Great Britain Patent Publication Nos. 838,070, 923,816, 1,160,508, 1,210,206, 1,601,122, and 2,038,988, and European Patent Application No. 0 177 475. The cables of these references, with the exception of U.S. Patent No. 607,932, are each strapped or wrapped. The tension and bending stress required to maintain a helical configuration according to the present invention are not suggested or disclosed by any of these references.

U.S. Pat. No. 3,269,422, at column 5, lines 10–19, discloses using a cabling machine to prepare the helically wound bundle. A cabling machine typically has a rotating spindle of spools, from which wires are pulled and twisted together. The length of cables, or twisted tube bundles, which can be prepared without coupling is limited only by the capacity of the spools.

It is therefore an object of the present invention to provide a method and apparatus to prepare helical wound bundles of externally coated metal tubing wherein the bundles do not require strapping to hold the bundles together, and wherein the bundles can be prepared in long lengths without coupling.

SUMMARY OF THE INVENTION

These and other objects are accomplished by an apparatus comprising:
 a spider which rotates around a central axis, the spider supporting a plurality of spools of individual tubes, each spool being rollable about an axis which lies in a plane which is about perpendicular to the central axis and each spool being rotatable about an axis parallel to the central axis in a direction opposite to the direction of rotation of the spider and at the same speed;
 a braking means which provides a resistance to the rolling motion of each individual tube spool wherein the resistance is a force about equal to or greater than $$\frac{2Yd^2 t}{D}$$

wherein
 Y is the yield stress of the individual tube,
 d is the outside diameter of the tube,
 t is the thickness of the tube metal, and
 D is the diameter to which the tube is bent around the spool; and
 a haul-off means which does not rotate about the central axis and is capable of pulling the individual tubes off the spools at a rate relative to the rate of rotation of the spider about the central axis which results in a constant pitch-length helix, wherein the bending stress due to the helical configuration of the outermost tubes is within the range of about one-half of yield to about yield.

An apparatus such as this is capable of preparing helically twisted bundles of tubing, the individual tubes preferably being between one-half inch in diameter and two inches in diameter. The bundles can be over a mile and typically as long as 5 miles without coupling. As such, the tubing bundles can be used to provide flowlines and control lines to subsea wellheads which are remote from an oil or gas production platform.

In a preferred embodiment the central axis of the bundling apparatus is vertical. A vertical central axis results in easy access to the spider, and enables a much larger spider to be utilized. The larger spider can permit spools containing longer lengths of tubing, larger diameter tubing, or more tubes to be incorporated in the bundle. An apparatus with a vertical central axis can also be provided which conveniently enables utilization of a wide variety of different spiders. This enables production of tubing bundles of various configurations without major changes to the apparatus.

BRIEF DESCRIPTION OF THE DRAWINGS

FIG. 2A is a side view of the details of one braking means.

DETAILED DESCRIPTION OF INVENTION

Figure 1:
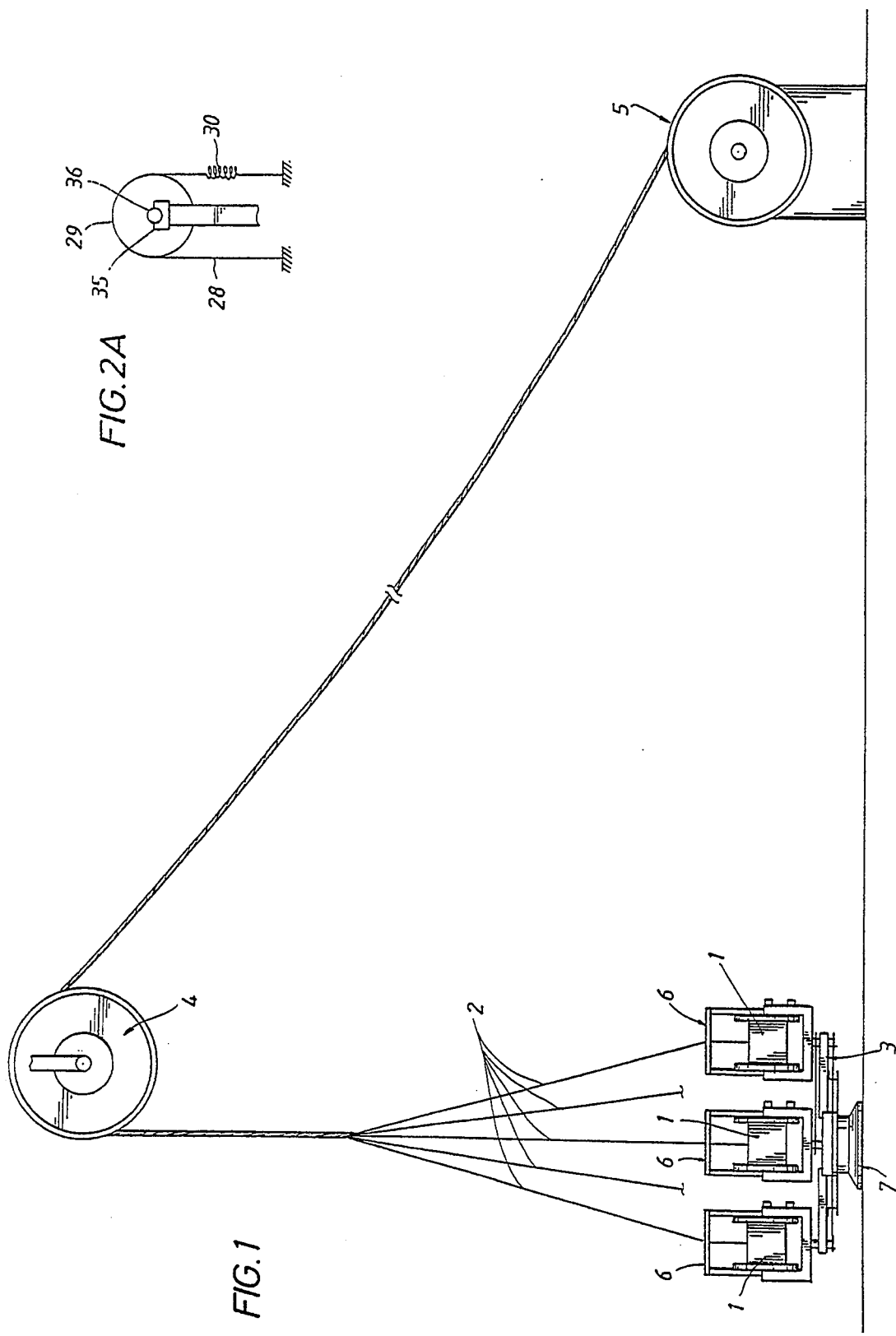
FIG. 1 is a schematic drawing of a preferred embodiment of the present invention.

Referring to FIG. 1, a preferred embodiment of the apparatus of this invention is shown. Spools, 1, containing coils of individual tubing, 2, are mounted on a spider, 3. The spider rotates as the haul-off means, shown as a capstan, 4, supported above the spider, draws the individual tubes from the spools 1 and passes the finished helical bundle over to the takeup reel 5. Guides, 6, enable the tubes to exit the spools without contacting the side flanges of the spools which would damage any external coating on the tubing. Spider 3, is mounted on a turntable, 7, which is capable of supporting the weight of the spools while being rotatable about the vertical central axis. A base to a crane would generally function well as such a turntable. Due to the weight to be supported, a vertical orientation for the axis of rotation is convenient, but a horizontal axis of rotation could also be used.

Figure 2:
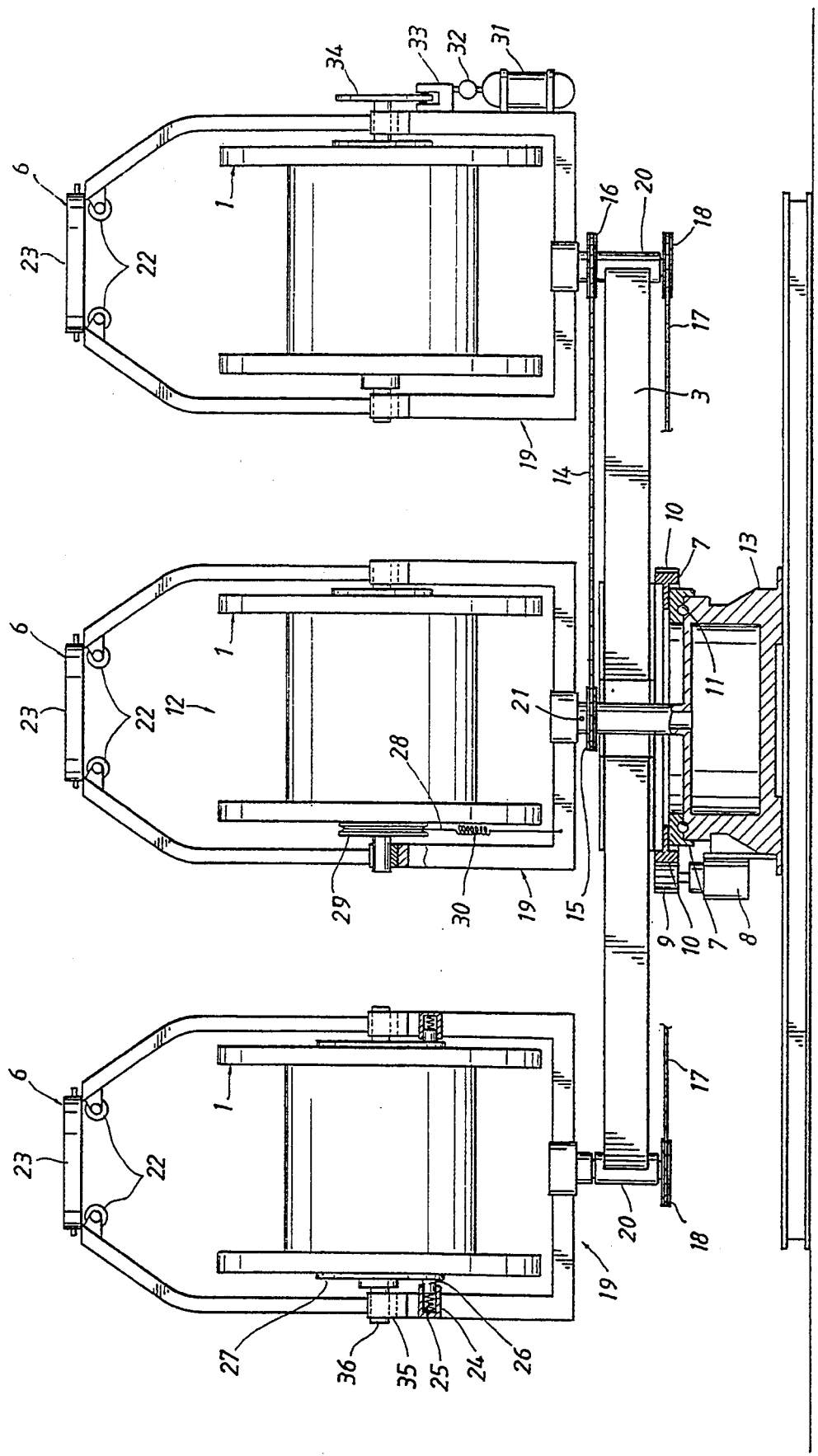
FIG. 2 is a drawing of a preferred rotatable spider of this invention.

Details of the preferred embodiment's turntable, spider, and individual tubing spools are shown in FIG. 2. Turntable, 7, is rotated by a motor, 8, which drives a gear, 9, which engage gear teeth, 10, on the turntable. The turntable is supported by bearings, 11, which provide for relatively easy rotation of the turntable. A central nonrotating spool, 12, is shown supported directly from the base, 13. The counter rotation of the individual spools is provided by a positioning chain, 14, which engages a sprocket 15 on the nonrotating central spool, 12, and a sprocket on one of the rotating spools, 16. The other spools are coordinated with the rotating spool to which the positioning chain is attached, by a coordinating chain, 17, connected to coordinating sprockets, 18.

The rotating spools are thus rotated in a direction opposite to the rotation of the turntable, 7, at the same speed the turntable is rotated, which provides that the spools all "face" one direction as the turntable rotates, and which therefore minimizes twisting of the tubes. The individual spools are supported on brackets, 19, which are rotatably supported on the spider by bearings, 20. The direction of the nonrotating center spool, 12, can be adjusted by loosening a set screw, 21, and rotating the spindle of the nonrotating center spool. The chains will rotate each of the rotating spools in the same direction and by the same amount as the center nonrotating spool spindle is rotated. This adjustment feature is preferred because the winding of the tubes will gradually develop an axial torsion which can be relieved by this rotation. As the helical tubing bundle of this invention is being prepared, it is therefore preferred to occasionally relieve the axial torsion by adjusting the position of the sprocket on this nonrotating spool.

Guides, 6, which may include rollers 22 and 23, are shown above the spools, 1, to help limit the position of the individual tubes as the individual tubes roll off the spools.

Three different braking means are shown in FIG. 2. The first embodiment of braking means shown comprises a cylinder, 24, containing a spring, 25, which urges a brake pad, 26, against a metal plate, 27, which is attached to the side of the spool, 1. An acceptable brake pad material is Texolite. The tension on the spring, 25, is preferably adjustable. This first braking means is preferred due to its simplicity. The second embodiment of braking means shown comprises a belt or cable 28 which passes around a pulley 29 attached to the side of the spool 1. Belt 28 is fastened to the frame 19 and is tensioned by an adjustable spring 30. In the third braking means, bottles of compressed gases, 31, provide a pneumatic pressure through regulators, 32, to calipers, 33. The calipers press together on rotating disks, 34. It is envisioned that standard automotive disk brakes can be utilized in this embodiment.

The spools are preferably supported on U-shaped bearings, 35, by axles, 36, protruding from the spools. The spools can then be conveniently lifted on to and off from the brackets by a crane or other lifting means.

Many different arrangements of spools can be envisioned. The tubes may be of the same size or may be of varying sizes. One preferred arrangement is for the central tube to be larger than the others, and have the central tube surrounded by six to ten smaller tubes, which can, of course, be of varying sizes.

It should be noted that the apparatus of this invention differs from the existing wire rope cabling machines primarily in the following ways: (1) greater braking force, (2) larger diameter spool hubs, (3) longer pitch length, and (4) no need for a closing head. These differing requirements all stem from the tubing being much stiffer and more vulnerable to bending than the wire rope.

The tension which must be maintained on the spools by the braking means is equal to or greater than:

$$\frac{2Yd^2t}{D}$$

wherein

Y is the yield stress of the tube;

d is the outside diameter of the tube;

t is the thickness of the metal tube; and

D is the diameter of tube curvature around the spool. This tension will prevent the tubing from "springing out" or "backlashing" from the spool.

The outer tubes must be bent around the helix sufficiently to hold the bundle together, but not so much as to plastically bend the outermost tubes significantly past the yield point. If a bundle of tubes is formed into a helix which is tight enough to yield the outermost tubes, the forces holding the bundle together do not increase in spite of the increased rotational effort of the bundling machinery and in spite of the additional length of tubing required. Further, it will be difficult to straighten a coiled bundle wherein tubes have yielded. Hence, an optimum pitch length exists wherein the bending stresses in the outer tubes are at yield or just be low yield.

The pitch length of the helix at the yield point may be expressed as:

$$2\pi r \left[ \frac{Ed}{2Yr} - 1 \right]^{\frac{1}{2}}$$

wherein:
r is the radius between the outer tube and bundle centerlines;
E is the modulus of elasticity of the tube;
d is the diameter of the outer tubes in the bundle; and
y is the yield stress of the tube.

Table 1 summarizes ranges of pitch length to outer tube diameter for various bundle configurations which will result in the bending stress due to the helical configuration being within a range of about one-half of yield to about yield. These dimensions are for a typical coil tubing product, QT-700 or equivalent, having a yield stress of about 70 ksi. N is the number of tubes in the bundle and r is the radius of the bundle. The configurations having 7 through 10 tubes have a single central tube having an outside diameter of $d_o$ surrounded by tubes having an outside diameter of d. The bundle having 12 tubes contains 3 inner tubes surrounded by nine outer tubes, all of the same diameter. The 19-tube bundle contains a seven-tube bundle core surrounded by 12 outer tubes. The pitch length l is defined as the length of the bundle required for each tube to wrap around the helix and back to its initial position.

TABLE 1

| N | $d_o/d$ | od/d | r/d | l/d |
|---|---|---|---|---|
| 3 | — | 2.1547 | 0.5774 | 69.79–98.77 |
| 7 | 1.0000 | 3.0000 | 1.0000 | 91.76–129.92 |
| 8 | 1.3048 | 3.3048 | 1.1524 | 98.47–139.45 |
| 9 | 1.6131 | 3.6131 | 1.3066 | 104.81–148.46 |
| 10 | 1.9238 | 3.9238 | 1.4619 | 110.83–157.00 |
| 12 | 3 × 1.00 | 4.0551 | 1.5275 | 113.27–160.48 |
| 19 | 7 × 1.00 | 5.0000 | 2.0000 | 129.47–183.52 |

When tubing which contains a polymeric coating is formed into a helical bundle, the tubing must be handled in such a way that the coating is not damaged. An individual tube coated with high-density polyethylene can be bent to a radius which is equal to or greater than about 25 times the diameter of the tube. For a bundle of tubes, this minimum radius is about 50 times the diameter of the largest tube. This minimum radius is critical in choosing the sizes of spools to be employed with the present invention bundling machine, or in conversion of a typical wire cable wrapping machine to a tube bundle preparation service. Because wire cable is very flexible, wire cable wrapping machines may require spools which have larger hubs and addition of rollers to increase the radius of bending at any given contact point to prevent damage to the external coating, whether polymeric or other type of coating. A wire cable wrapping apparatus will also require installation of a more substantial brake means to provide sufficient tension and the removal of any existing "closing head," to be useful as the apparatus of this invention. Such a modified wire cable wrapping machine would be suitable for preparation of six or seven tube bundles in the size range of one-half to three-fourth inch diameter tubes. The larger size cabling machines are capable of producing tube bundle of this size in lengths of more than a mile with each run.

I claim:

1. An apparatus for making helical coiled bundles of metal tubes which bundles do not require strapping, the apparatus comprising:
   a spider which rotates around a central axis, the spider supporting a plurality of spools of individual tubes, each spool being rollable about an axis which lies in a plane which is about perpendicular to the central axis and each spool being rotatable about an axis parallel to the central axis in a direction opposite to the direction of rotation about the central axis and at about the same speed;
   a braking means which provides a resistance to the rolling motion of each individual tube spool wherein the resistance is a force about equal to or greater than $$\frac{2Yd^2 t}{D}$$

wherein
Y is the yield stress of the individual tube,
d is the outside diameter of the tube,
t is the thickness of the tube metal, and
D is the diameter to which the tube is bent around the spool; and
   a haul-off means which does not rotate about the central axis and is capable of pulling the individual tubes off the spools at a rate relative to the rate of rotation of the spider about the central axis which results in a constant pitch length helix, wherein the bending stress due to the helical configuration of the outermost tubes is within the range of about one-half of yield to about yield.

2. The apparatus of claim 1 wherein the central axis is an essentially vertical axis.

3. The apparatus of claim 1 further comprising a central, nonrotating spool of tubing which is capable of providing a central tubing about which helical coiled tubes are wound.

4. The apparatus of claim 3 wherein from six to ten tubes are helically wound around the central tube.

5. The apparatus of claim 1 wherein the braking means comprises a brake pad urged against a metal plate attached to a side of the spool.

6. The apparatus of claim 1 wherein the braking means is a taut belt or cable wrapped partially around a pulley which is attached to the side of the spool.

7. The apparatus of claim 1 wherein the braking means is a hydraulically, pneumatically, or spring-actuated disk brake.

8. The apparatus of claim 1 further comprising a means to adjust the position of the individual spools in the rotation about the axis that lies in a plane that is perpendicular to the central axis to relieve axial torsion of the tube.

9. A method to prepare a long bundle of helical wound metal tubes wherein strapping is not required comprising:
   providing spools of individual tubes;
   supporting the spools on a spider;
   rotating the spider around a vertical central axis;
   rotating the individual spools about an axis parallel to the central axis at a speed which is about the speed of rotation of the spider and the direction of the rotation is the opposite;
   pulling each tube off its spool by a nonrotating haul-off means at a rate that, in conjunction with the rate of rotation of the spider, winds the tubes in a constant pitch length helix with a bending stress of the outermost tube due to the helical configuration of about one-half of yield to about yield; and providing a braking force that resists the pulling off of the tubes from the spools equal to or greater than $$\frac{2Yd^2t}{D}$$

wherein

Y is the yield stress of the individual tube, d is the outside diameter of the individual tube, t is the metal tube wall thickness, and D is the diameter to which the tube is bent around the spool.

10. The method of claim 9 further comprising providing a central tube around which the other tubes are helically wound.

11. The method of claim 9 further comprising wrapping between six and ten tubes around a central tube and the central tube has an outside diameter which is equal to or greater than the outside diameter of the other tubes.

* * * * *